United States Patent [19]
Nepote

[11] 3,829,041
[45] Aug. 13, 1974

[54] FISHING REEL DRIVE MECHANISM

[75] Inventor: Alain Robert Nepote, Cluses, France

[73] Assignee: Etablissements Carpano & Pons S.A., Cluses, France

[22] Filed: July 24, 1972

[21] Appl. No.: 274,794

[30] Foreign Application Priority Data
July 26, 1971 France .............................. 71.27295

[52] U.S. Cl. ................................ 242/218, 242/219
[51] Int. Cl. .......................................... A01k 89/02
[58] Field of Search ........... 242/220, 218, 219, 211; 188/82.34, 84.3, 82.77, 82.7; 192/14

[56] References Cited
UNITED STATES PATENTS
1,547,238  7/1925  Russell et al. ....................... 242/219
1,829,006  10/1931  Kautzky, Jr. ........................ 242/219

Primary Examiner—Billy S. Taylor
Attorney, Agent, or Firm—Robert E. Burns; Emmanuel J. Lobato; Bruce L. Adams

[57] ABSTRACT

A fishing reel driving and drag mechanism includes a driving piece secured for rotation with the shaft of a winding handle, and an arcuate lever pivotally mounted on the driving piece about an axis parallel to said shaft. When the handle is rotated in a winding direction, said lever pivots to an outer position in which an outer protuberance on the lever drivable engages a corresponding eccentric protuberance on a driving member which is driven in a corresponding winding direction without slip. If the winding handle is inadvertently rotated in an unwinding direction, or when the driving member is rotated in the unwinding direction, said lever pivots to its inner position in which an inner protuberance jams with a fixed stop to immobilize said handle whilst said driving member can continue to rotate with a certain drag. Pivoting of said lever can, at least partially, be provided by a spring tending to immobilize the free end of the lever.

4 Claims, 4 Drawing Figures

PATENTED AUG 13 1974

3,829,041

FISHING REEL DRIVE MECHANISM

BACKGROUND OF THE INVENTION

The invention relates to fishing reels of the type in which line may be wound onto a spool by means of a winding handle, generally associated with a gear mechanism.

Such fishing reels can be categorized into the mobile spool type and the fixed spool type. In the former, the reel is winch-like, the spool being rotated by the handle when winding in line, and rotating in the opposite direction when line is wound out. In the latter, the spool is disposed with its axis generally parallel to the fishing rod and perpendicular to the axis of the winding handle. To wind in line, the line is driven away by a rotating pick-up member and is wound about the fixed spool; during casting, the pick-up is retracted and the line freely unwinds from the spool.

In both cases, an adjustable drag mechanism is provided between the handle and the line driving member (spool or pick-up) so as to avoid that any unusually large tension in the line, for example when fighting a fish, causes breakage of the line. The adjustable drag mechanism is generally formed by a friction clutch, many types of which are well known. According to the type of reel, these mechanisms are located either between the fixed spool and the frame of the reel, or between the shaft controlling the line driving member and said member. The invention is particularly concerned with this last mentioned type of reel.

For the angler, it is important that operation of the drag mechanism should not cause rotation of the winding handle in the direction opposite to that for winding in line; such a rotation would be inconvenient since it would oblige the angler to release the winding handle when a fish pulls the line. However, reverse rotation of the winding handle is generally impossible, since most reels incorporate a one-way device of known type.

The problem is therefore to provide a reel with a device which enables the angler, by means of the winding handle, to positively drive the line-winding members in one direction without any slip, whilst if a fish exerts a traction on the line, the drag mechanism should operate without the winding handle being turned in the reverse direction. Also, the winding handle should be prevented from turning in the reverse direction in the case of an incorrect operation by the angler.

This problem has already been solved, but using complicated means including a large number of component parts and therefore involving a high cost price.

It is notably known to employ a cam-operated pawl cooperating with projections on a driving wheel. However, such a pawl only carries out one of the functions, namely slip free drive for the purpose of winding in the line. The non-reverse or one-way function is fulfilled by other means. (see U.S. Pat. Specification No. 3,139,241).

OBJECT OF THE INVENTION

It is an object of the invention to provide a mechanism of the type mentioned above which is of simpler construction than known mechanisms and in which a single pawl, in the form of a lever, ensures both the non-slip drive and the non-reverse functions.

BRIEF DESCRIPTION OF THE DRAWINGS

A preferred embodiment of the mechanism according to the invention will now be described, by way of example, with reference to the accompanying drawings which show the essential elements of a fishing reel incorporating said mechanism, other well known parts of the fishing reel having been omitted for clarity, and in which.

DESCRIPTION OF A PREFERRED EMBODIMENT

Figure 1:
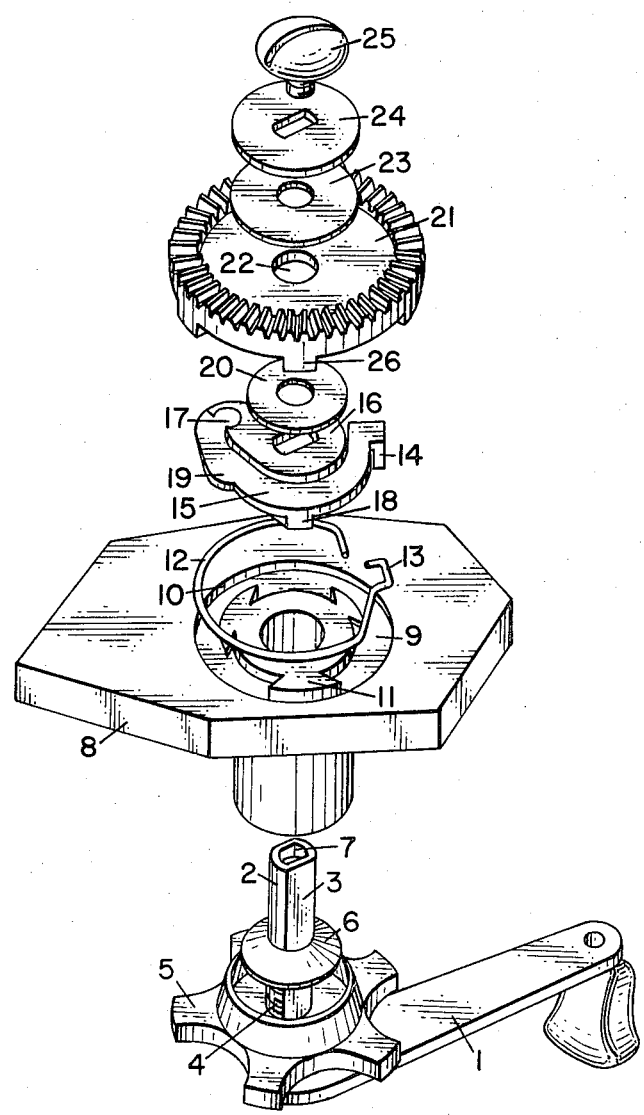
FIG. 1 is an exploded perspective view of the mechanism.

With reference to FIG. 1, a fishing reel winding handle 1 is integral with a shaft 2 having two flats 3 for a purpose which will be described later. Shaft 2 includes, at its end adjacent handle 1, a threaded part 4 on which a star-shaped nut 5 is screwed and can be easily manually manipulated. Nut 5 has a cylindrical recess in which a dished washer 6 in highly resilient material is housed so as to form an axially acting spring. The end of shaft 2 opposite handle 1 has a tapped bore 7.

Shaft 2 is freely rotatably mounted in a partially shown fixed support plate 8 of the fishing reel. On its inner side, i.e., the side opposite to handle 1 and through which shaft 2 protrudes, plate 8 has a cylindrical recess 9 including at its periphery a circular groove 10 of semi-circular cross-section. A central embossment 11 is provided in recess 9, said embossment having a central cylindrical part with three outwardly projecting dove-tail shaped teeth the outer faces of which are defined on a common cylindrical surface.

In groove 10 is housed a spring 12 formed of a wire of metal or any other suitable resilient material. One end 13 of spring 12 is hook-shaped to receive a protuberance 14 of a rigid lever 15, said lever being disposed in a plane perpendicular to shaft 2 and coplanar with a substantially oval-shaped driving piece 16 to which it is connected. At its end opposite protuberance 14, lever 15 terminates with a part-cylindrical head 17 which is freely pivotally mounted in a corresponding part-cylindrical opening in piece 16. The disposition of said opening and said head 17 is such as to allow lever 15 a certain pivotal movement about the axis of head 17. Lever 15, which is of a general overall arcuate shape so as to fit around piece 16, also has a second protuberance 18 protruding from the lower face thereof (looking at FIG. 1) and disposed in the same general plane as protuberance 14, and a third protuberance 19 protruding laterally outwards from the lever, protuberance 19 being disposed in the general plane of the lever. The particular shape of the lever 15 and its protuberances, particularly protuberance 18, is best seen on FIGS. 2 to 4.

Piece 16 has an aperture of the same shape as shaft 2, i.e., with two flats, so that said shaft passes through piece 16 without play and the handle 1 is rigidly rotatably connected with piece 16.

Above piece 16 is mounted a flat washer 20, in a high-friction material, with a central cylindrical aperture. Finally, a disc-like driving member 21 for rotating the line winding member is mounted. In the example shown, member 21 is a toothed wheel adapted to mesh with means for driving the pick-up of a fixed spool reel.

For a mobile spool reel, this toothed wheel would be replaced by a member which either directly or indirectly (via a gear mechanism) drives the spool.

Figure 2:
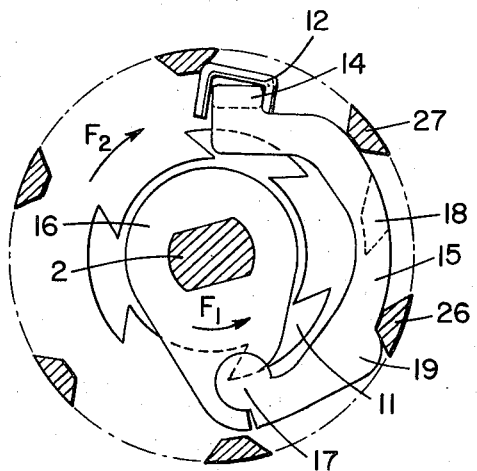
FIGS. 2, 3 and 4 are schematic views illustrating three phases of operation of the mechanism.
Figure 3:
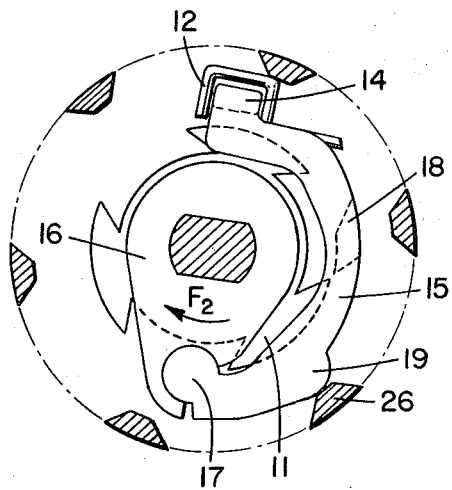
Figure 4:
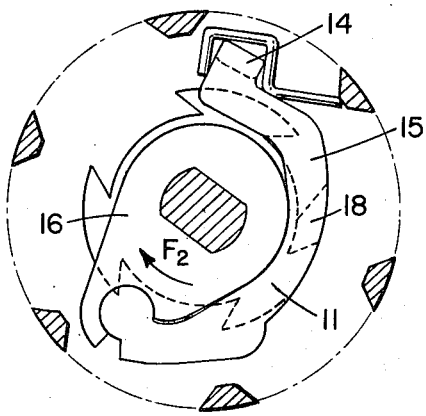

At its periphery, toothed wheel 1 carries a plurality of axially protruding protuberances 26 of a substantially trapezoidal shape, as shown in FIGS. 2 to 4. Wheel 21 also has a central cylindrical aperture 22 which fits freely over the cylindrical part of shaft 2.

Over wheel 21, shaft 2 carries a washer 23 in high-friction material and having a cylindrical aperture and a smooth washer 24 having an aperture of the same shape as shaft 2, so that washer 24 is rigidly connected for rotation with shaft 2, in the same manner as piece 16.

The elements of the mechanism are mounted together by successively placing the elements over shaft 2, whilst ensuring that protuberance 14 of lever 15 correctly engages in the bent end 13 of spring 12, and that the cylindrical head 17 of lever 15 correctly engages in the corresponding opening in piece 16. A screw 25 is then fully screwed into bore 7 to hold the assembly together.

The friction clutch drag action of the described mechanism is provided by the friction produced between the upper face of piece 16, the two faces of washer 20, the two faces of toothed wheel 21, the two faces of washer 23, and the lower face of washer 24. The pressure applied between said faces depends on the force provided by springforming resilient washer 6; this pressure can be adjusted by the angler by screwing or unscrewing nut 5 on shaft 2. The correct drag adjustment is obtained when the angler, by pulling on the line, unwinds line from the spool with an effort compatible with the strength of the line.

Operation of the described mechanism takes place as shown in the partial views of FIGS. 2, 3 and 4, which show the device in cross-section taken in the plane of the underneath face of toothed wheel 21, with washer 20 removed.

In FIG. 2 it is supposed that piece 16 is rotated by handle 1 (not shown) and shaft 2 in the direction F1, which is the direction corresponding to winding in of the line. Piece 16 urges lever 15 in the same direction, by acting on its head 17. Spring 12, engaging on protuberance 14, tends to oppose rotation of lever 15 in direction F1, and causes lever 15 to pivot outwardly about the axis of head 17. Protuberance 19 of lever 15 comes into contact with one of protuberances 26 of wheel 21. As shown in FIG. 2, at the point of contact a jamming is produced, which is further re-inforced by contact of the outer face of lever 15 with the next protuberance 27, so that wheel 21 is positively rotatably driven by lever 15, piece 16, shaft 2 and handle 1, without any slipping. During this movement, all of the parts of the mechanism, with the exception of plate 8, are driven at the same angular speed so that no drag effect is provided. However, spring 12, only a part of which is shown, is driven by protuberance 14 of lever 15 along groove 10 with a slight friction which is of no consequence to the operation.

If the angler inadvertently turns the handle 1 in the reverse direction, i.e., in direction F2 (FIG. 3), piece 16 drives lever 15 in the direction F2 by engagement of head 17. Lever 15 thus pivots inwardly about its head 17 since movement of protuberance 14 in direction F2 is opposed by the loop of spring 12. This pivoting movement firstly separates the protuberances 19 and 26, as well as the outer face of lever 15 and protuberance 27, as shown in FIG. 3. This first phase of the reverse rotational movement takes place without encountering any obstacle or producing any braking effect. By continuing rotation of handle 1 in direction F2, piece 16 continues to turn in the same direction driving the lever 15 which pivots closer to the outer edge of piece 16. At a given moment, protuberance 18, which protrudes from the lower surface "lever 15 (looking at FIG. 1), engages inside the outer cylindrical surface defining the outer edges of stop-forming teeth of embossment 11. The inclination of the two lateral surfaces of protuberance 18 and one of the teeth is such that protuberance 18 then comes to jam fully against the central cylindrical part of a tooth and one face of the tooth, as shown in FIG. 4. Said embossment 11 being fixed to plate 8, lever 15 is thus locked against further rotation, as are piece 16 and handle 1. The mechanism is thus effectively "one-way" or "non-reverse." Any rotation of handle 1 in direction F1 frees lever 15 from locking engagement with the teeth of embossment 11, and pivots the lever 15 back to the position shown in FIG. 2.

In the case where a fish, caught on a hook, fights and exerts a traction on the line, this traction is transmitted to toothed wheel 21. If this traction exceeds the pre-set value of the drag mechanism, wheel 21 is driven in direction F2 against the frictional force produced between parts 16, 20, 21, 23 and 24. If the mechanism were, for example, in the position of FIG. 2, protuberance 26 of wheel 21 pushes lever 15, by its protuberance 19, in direction F2, and this movement is transmitted to piece 16 by head 17. Protuberance 26 also tends to inwardly coact against protuberance 19 to inwardly pivot lever 15 about the axis of head 17. When lever 15 has inwardly pivoted about head 17 by a sufficient amount to move lever 15 out of the path of protuberances 26, and if wheel 21 continues to rotate in direction F2, wheel 21 tends to turn, inter alia, friction washer 20. Piece 16 is thus also driven in direction F2 by friction, and in turn piece 16 rotates lever 15 in direction F2, and lever 15 continues to pivot inwardly from the position of FIG. 3 to that of FIG. 4, until the lever 15, piece 16 and handle 1 become locked by engagement of protuberance 18 and a stop-forming tooth of embossment 11. From this moment, wheel 21 can continue to rotate under the effect of the traction exerted by the fish, against the resistance provided by the drag mechanism, without the winding handle 1 being rotated in the same direction. As soon as the fish ceases to fight, the angler can, by rotating handle 1 in direction F1, return to the "positive" control of winding in the line without any slipping of wheel 21 and the line-winding member.

It should be noted that during the phase when lever 15 pivots inwardly towards piece 16, either as a result of inadvertent rotation of handle 1 in the reverse direction to winding in, or under the effect of a traction exerted by a fish, the protuberance 18 of lever 15 may come into contact with the peripheral part of one of the teeth of embossment 11. In this case, piece 16 continues to rotate in direction F2, driving lever 15 until protuberance 18 leaves the outer periphery of one tooth, penetrates between two teeth and comes to jam against the side of the next tooth.

It can be seen that the principal elements of the mechanism according to the invention are the driving piece 16, lever 15 and spring 12; these three parts are particularly simple and robust and can be mass produced by simple and economical means such as cutting-out, moulding or pressing.

A fishing reel incorporating a mechanism according to the invention can be used for all types of sport or recreational fishing.

What is claimed is:

1. In a fishing reel drive mechanism, comprising adjustable friction clutch drag means connected between a winding handle and a rotatable driving member, said drag means including means for providing non-slip drive of said driving member in a first direction upon rotation of said handle in a corresponding first direction and means for allowing rotation of said driving member, with a certain drag, in a second direction opposite without rotation of said handle in said second direction, the combination of: a driving piece secured for rotation with said handle, a lever one end of which is pivotally mounted in an opening in said driving member, said lever being rotatable with said driving member, said lever including a first protuberance which abuts during rotation of said handle in said first direction with at least one eccentric projection provided on the periphery of said driving member so as to drivably engage said driving member for non-slip rotation with said handle, said lever including a second protuberance in a different plane to said first protuberance, said second protuberance including an inclined face which when said handle is rotated in said second direction comes to engage with at least one inclined face of at least one tooth protruding from a fixed plate of the reel frame, engagement of said inclined faces locking said lever, said driving piece and said handle against rotation.

2. Mechanism according to claim 1, in which said first protuberance of said lever and an eccentric projection of said driving member include contacting faces inclined such that, when said driving member is rotated in said second direction, said projection of said driving member tends to pivot said lever about its pivoting axis to move said first protuberance out of the path of said projections of said driving member and to move said second protuberance towards the axis of rotation of said handle until said second protuberance engages and jams against a corresponding face of one of said teeth protruding from said frame to lock said driving piece and said handle against rotation whilst said driving member is able to continue to rotate in said second direction.

3. Mechanism according to claim 2, in which the end of said lever opposite said one pivoted end is connected to the end of a spring wire movably mounted in a circular groove provided in the reel frame, said spring tending to prevent rotation of said opposite end of said lever and to ensure that rotation of said handle in said first direction pivots said lever such that said first protuberance comes to drivably abut against one of said projections of said driving member.

4. In a fishing reel driving and drag mechanism, comprising a support, a winding handle, a rotatable driving member, means for positively rotating said driving member in a first direction, without drag, upon rotation of said handle in a corresponding first direction, means for locking said handle against rotation in a second direction opposite to said first direction, and friction clutch means operatively connecting said handle and driving member for allowing rotation of said driving member in said second direction with a given drag, the combination of:

a. a driving piece secured for rotation with said handle about a first axis;

b. a lever secured at one end thereof to said driving piece for rotation with said driving piece about said first axis and for pivotal movement relative to said driving piece about a second axis parallel to said first axis;

c. at least one protuberance on said driving member, said driving member being coaxial to said first axis and having at least one eccentric protuberance lying in the plane of movement of at least a first part of said lever;

d. at least one fixed stop on said support, said at least one fixed stop being eccentric to said first axis and lying in the plane of movement of at least a second part of said lever;

e. said lever being pivotally movable about said second axis between a first angular position in which when said driving piece is rotated about said first axis in said first direction said first part of said lever drivably engages with a protuberance on said driving member and a second angular position in which when said driving piece is rotated about said first axis in said second direction said second part of said lever engages with a fixed stop on said support and rotatably locks said driving piece and said handle;

f. means for pivoting said lever from said second to said first angular position when said handle is rotated in said first direction;

g. means for pivoting said lever from said first to said second angular position when said handle is rotated in said second direction; and h. means for pivoting said lever from said first to said second angular position when said driving member is rotated in said second direction.

* * * * *